(12) United States Patent
Wang et al.

(10) Patent No.: US 10,219,018 B2
(45) Date of Patent: Feb. 26, 2019

(54) METHOD OF CONTROLLING DISPLAY DEVICE FOR PROVIDING CONTENT AND DISPLAY DEVICE PERFORMING THE SAME

(71) Applicant: SAMSUNG ELECTRONICS CO., LTD., Suwon-si (KR)

(72) Inventors: Tae-ho Wang, Seoul (KR); Hyo-ri Park, Seoul (KR); Mi-young Lee, Seoul (KR); Jae-young Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/586,240

(22) Filed: Dec. 30, 2014

(65) Prior Publication Data
US 2015/0189348 A1   Jul. 2, 2015

(30) Foreign Application Priority Data

Dec. 30, 2013 (KR) .................. 10-2013-0167583
Sep. 18, 2014 (KR) .................. 10-2014-0124629

(51) Int. Cl.
*H04N 5/445* (2011.01)
*H04N 21/2665* (2011.01)
(Continued)

(52) U.S. Cl.
CPC ......... *H04N 21/2665* (2013.01); *H04L 67/22* (2013.01); *H04N 21/25816* (2013.01);
(Continued)

(58) Field of Classification Search
CPC ........... H04N 21/4622; H04N 7/17318; H04N 5/44543; H04N 5/4401; H04N 5/50;
(Continued)

(56) References Cited

U.S. PATENT DOCUMENTS 6,401,243 B1 * 6/2002 Suzuki .................. H04H 20/33
                                                    348/E7.073
7,185,355 B1 * 2/2007 Ellis .................. H04N 5/44543
                                                    348/E5.105
(Continued)

FOREIGN PATENT DOCUMENTS

EP    2 677 758 A1    12/2013
JP    2007-36874 A     2/2007
JP    2012-156965 A    8/2012

OTHER PUBLICATIONS

Shunichi Seko, et al.; Video Content Recommendation for Group Based on Viewing History and Viewer Preference; 2011 IEEE International Conference on Consumer Electronics; XP031921269; Jan. 9, 2011; pp. 351-352.

(Continued)

*Primary Examiner* — Annan Shang
(74) *Attorney, Agent, or Firm* — Sughrue Mion, PLLC

(57) ABSTRACT

Provided are a display device for allowing a first user to use information about content played by a device of a second user, when the user selects content to be received and played via the display device, and a method of controlling the same. The method includes the first display device providing first user identification information of the first user to a server; obtaining, from the server, electronic content guide information including second user identification information of a second user that is related to the first user and playback content identification information that corresponds to the second user; displaying, on the first display device, a user interface (UI) for selecting content that corresponds to the playback content identification information, based on the electronic content guide information; and the first display device playing content that is selected by using the UI.

20 Claims, 16 Drawing Sheets

(51) Int. Cl.
- *H04N 21/472* (2011.01)
- *H04N 21/482* (2011.01)
- *H04N 21/478* (2011.01)
- *H04N 21/475* (2011.01)
- *H04N 21/258* (2011.01)
- *H04N 21/462* (2011.01)
- *H04L 29/08* (2006.01)
- *H04N 21/262* (2011.01)
- *H04N 21/266* (2011.01)
- *H04N 21/658* (2011.01)

(52) U.S. Cl.
CPC . *H04N 21/25875* (2013.01); *H04N 21/25891* (2013.01); *H04N 21/26258* (2013.01); *H04N 21/26603* (2013.01); *H04N 21/4622* (2013.01); *H04N 21/472* (2013.01); *H04N 21/478* (2013.01); *H04N 21/4753* (2013.01); *H04N 21/47217* (2013.01); *H04N 21/482* (2013.01); *H04N 21/6582* (2013.01)

(58) Field of Classification Search
CPC ...... H04N 5/46; H04N 21/482; H04N 21/478; H04N 21/84; H04N 21/4821; H04N 21/4316; H04N 21/47214; H04N 21/4532; H04N 21/435; H04N 21/4345; H04N 21/4782; H04N 21/8586; H04N 21/4334; H04N 21/41407; H04N 21/6131; H04N 5/48
USPC ............................. 725/37–61; 709/217–232
See application file for complete search history.

(56) References Cited

U.S. PATENT DOCUMENTS

| | | | | |
|---|---|---|---|---|
| 8,200,681 | B2* | 6/2012 | Hedge | G06F 17/30029 707/758 |
| 2001/0023436 | A1* | 9/2001 | Srinivasan | G11B 27/031 709/219 |
| 2002/0059610 | A1* | 5/2002 | Ellis | H04N 5/44543 725/58 |
| 2002/0065912 | A1* | 5/2002 | Catchpole | G06F 17/30873 709/224 |
| 2002/0104087 | A1* | 8/2002 | Schaffer | H04N 7/163 725/46 |
| 2004/0003090 | A1* | 1/2004 | Deeds | H04L 65/4076 709/227 |
| 2004/0034873 | A1* | 2/2004 | Zenoni | H04N 7/17318 725/135 |
| 2005/0027802 | A1* | 2/2005 | Madsen | G06Q 10/06 709/204 |
| 2005/0035846 | A1* | 2/2005 | Zigmond | G08C 17/02 340/5.22 |
| 2005/0193414 | A1* | 9/2005 | Horvitz | H04N 21/482 725/46 |
| 2006/0010464 | A1* | 1/2006 | Azami | H04H 60/31 725/9 |
| 2006/0026279 | A1* | 2/2006 | Zigmond | H04L 12/2803 709/224 |
| 2006/0218181 | A1* | 9/2006 | Jeon | G06F 17/3089 |
| 2006/0282851 | A1* | 12/2006 | Errico | G06Q 10/10 725/39 |
| 2007/0042710 | A1* | 2/2007 | Mahini | H04M 1/72547 455/3.03 |
| 2007/0239869 | A1* | 10/2007 | Raghav | G06Q 10/10 709/224 |
| 2008/0066111 | A1* | 3/2008 | Ellis | H04N 5/44543 725/57 |
| 2008/0163302 | A1* | 7/2008 | Khedouri | G06F 17/30094 725/46 |
| 2009/0051755 | A1* | 2/2009 | Toya | H04L 29/06027 348/14.08 |
| 2009/0077584 | A1* | 3/2009 | Glasgow | H04N 5/44543 725/39 |
| 2009/0133071 | A1* | 5/2009 | Sakai | H04N 5/4403 725/46 |
| 2011/0216640 | A1* | 9/2011 | Curtis | G11B 7/00 369/100 |
| 2012/0030587 | A1* | 2/2012 | Ketkar | G06F 17/30038 715/751 |
| 2012/0174162 | A1 | 7/2012 | Roberts et al. | |
| 2013/0024879 | A1* | 1/2013 | Bruich | H04H 60/33 725/9 |
| 2013/0081081 | A1* | 3/2013 | Wang | H04N 21/25875 725/38 |
| 2013/0152184 | A1* | 6/2013 | Wang | H04L 51/32 726/7 |
| 2013/0205375 | A1* | 8/2013 | Woxblom | H04L 63/08 726/4 |
| 2013/0291037 | A1* | 10/2013 | Im | H04N 21/4788 725/109 |
| 2013/0332959 | A1 | 12/2013 | Kothari | |
| 2014/0089306 | A1* | 3/2014 | Rana | G06F 17/30554 707/731 |
| 2014/0317660 | A1* | 10/2014 | Cheung | H04N 21/6175 725/44 |
| 2015/0082330 | A1* | 3/2015 | Yun | H04N 21/233 725/14 |
| 2015/0249872 | A1* | 9/2015 | Lee | G06Q 30/06 725/32 |
| 2017/0223422 | A1* | 8/2017 | Maruyama | H04N 21/482 |

OTHER PUBLICATIONS

Communication dated Apr. 28, 2015 issued by the European Patent Office in counterpart European Patent Application No. 14200322.7.

* cited by examiner

FIG. 8

| RELEVANT USER ID | PLAYBACK CONTENT ID |
|---|---|
| user001 | content_011 |
| user002 | content_021 |
| user003 | content_031 |
| user004 | content_041 |

FIG. 10
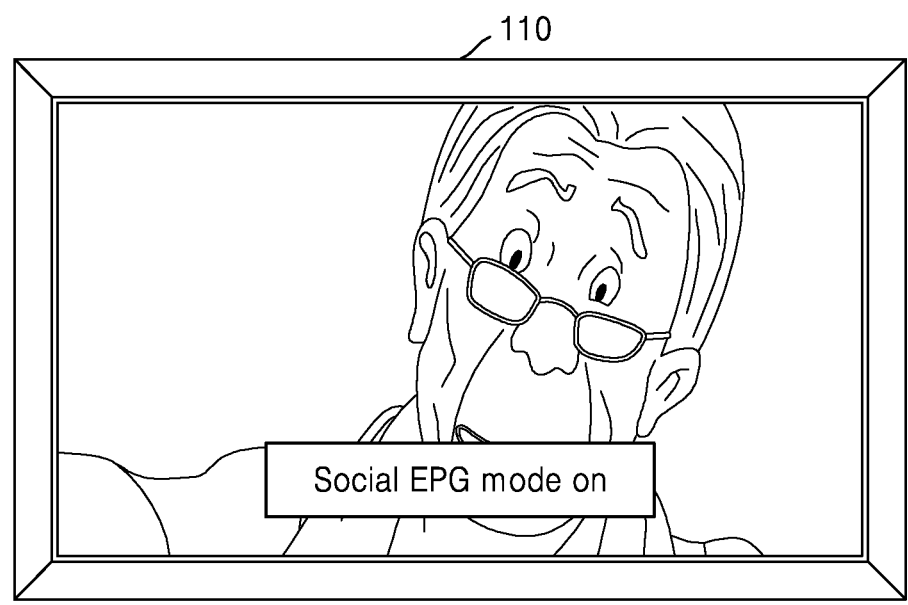
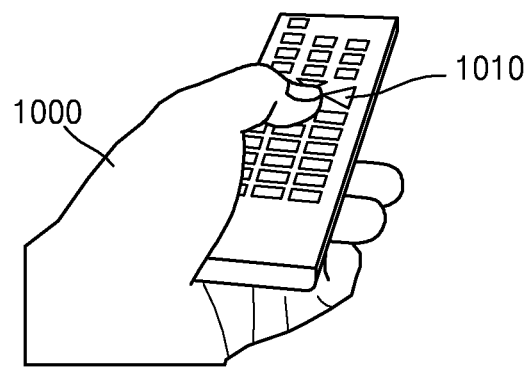

METHOD OF CONTROLLING DISPLAY DEVICE FOR PROVIDING CONTENT AND DISPLAY DEVICE PERFORMING THE SAME

RELATED APPLICATIONS

This application claims priority from Korean Patent Application No. 10-2013-0167583, filed on Dec. 30, 2013, and Korean Patent Application No. 10-2014-0124629, filed on Sep. 18, 2014, in the Korean Intellectual Property Office, the disclosures of which are incorporated herein in their entireties by reference.

BACKGROUND

1. Field

Apparatuses and methods consistent with one or more exemplary embodiments relate to a display device and a server for playing content, and a method of controlling a display device and server, and more particularly, to a method and a device for providing content, by using a display device and a server which allow data communication, and a social network service (SNS).

2. Description of the Related Art

As technology has advanced, various forms of display devices have been developed. Thus, display devices may perform many functions related to both data communication and content playback.

As the development of display devices has progressed, so has the development of content that can be provided to a user via these display devices. For example, content produced by a broadcasting station is transmitted via a radio wave transmission medium such as a broadcasting network broadcasting through cable, a ground wave, or a satellite broadcasting provider, and a viewer may view this content using by a receiver equipped for receiving each of these various transmission mediums, or using a display device connected to such a receiver.

As various types of contents are provided, a user needs a method of selecting desired content for viewing. For example, a user may directly select a desired broadcasting channel by using a channel change button. Also, an electronic program guide (EPG), for providing information about content, may be provided to a user. An EPG is a broadcasting program guide service for providing the time a TV program is available, a description of the program, information about cast members, and other related information by using a free broadcasting frequency band or an additional broadcasting channel. A received program guide may be stored in a memory device in a set-top box or a TV receiver. A viewer may perform operations such as program selection, program reservation, ordering of a pay-per-view program, program searching, or video recording, by controlling electronic program information by using a remote controller.

As use of the Internet has increased, various types of social network services, in which a certain relation between users is established, such as www.myspace.com and www.facebook.com in the US and www.cyworld.com in Korea, have also been developed.

Accordingly, users demand a technology for sharing content among users communicating via a social network service.

SUMMARY

One or more exemplary embodiments may include a display device and a server for allowing a user to use information about content played by a device of another user, when the user selects content to be received and played via the display device thereof, and a method of controlling the same.

One or more exemplary embodiments may include a method of controlling the display device and a method of controlling the server.

Additional exemplary aspects will be set forth in part in the description which follows and, in part, will be apparent from the description, or may be learned by practice of the presented exemplary embodiments.

According to an aspect of an exemplary embodiment, a method of controlling a first display device so that the first display device selects content and plays the selected content includes: providing first user identification information of a first user to a server, which is performed by the first display device; obtaining electronic content guide information, which includes second user identification information of a second user that is related to the first user and playback content identification information that corresponds to the second user, from the server; displaying a user interface (UI) for selecting content that corresponds to the playback content identification information on the first display device, based on the electronic content guide information; and playing content that is selected by using the UI.

The UI may include profile information that corresponds to the second user identification information, and the displaying of the UI may include displaying the profile information in an order based on a closeness value between the first user identification information and the second user identification information.

The closeness value may be determined based on a result of comparing at least one piece of information selected from a group consisting of a type of preferred content, personal information, and view history information, between the first user identification information and the second user identification information.

The method may further include setting of a content-sharing mode, wherein the playing of the content selected by using the UI includes sequentially changing the content played by the first display device among content related to the second user identification information in the order in which the second user identification information is arranged, if a preset input is received. The preset input may be a command which, when the content-sharing mode is not set, is a command for changing a channel to select the content played by the first display device.

The electronic content guide information may further include view history information that corresponds to the second user identification information, and the UI displayed on the first display device may include the view history information.

According to an aspect of another exemplary embodiment, a method of controlling a server includes: receiving first user identification information of a first user from a first display device; receiving from a second display device second user identification information of a second user and playback content identification information of content that is being played by the second display device; calculating a closeness value with respect to closeness between the first user and the second user; generating electronic content guide information that is arranged based on the closeness value; and transmitting the electronic content guide information to the first display device, wherein the electronic content guide information includes the second user identification information and the playback content identification information that corresponds to the second user identification information.

The closeness value may be determined based on a result of comparing at least one piece of information selected from a group consisting of a type of preferred content, personal information, and view history information, between the first user identification information and the second user identification information.

The electronic content guide information may further include view history information that corresponds to the second user identification.

According to an aspect of another exemplary embodiment, a first display device includes: a communication unit for transmitting first user identification information of a first user to a server; a control unit configured to obtain electronic content guide information, which includes second user identification information of a second user that is related to the first user and playback content identification information that corresponds to the second user identification information, from the server via the communication unit; and a display unit for displaying a user interface (UI) for selecting content that corresponds to the playback content identification information, based on the electronic content guide information, wherein the control unit controls the display unit for playing the content by using the UI.

The UI may include profile information that corresponds to the second user, and the control unit may control the display unit to display the profile information in an order based on a closeness value with respect to closeness between the first user and the second user.

The closeness value may be determined based on a result of comparing at least one piece of information selected from a group consisting of a type of preferred content, personal information, and view history information, between the first user identification information and the second user identification information.

The control unit may set a content-sharing mode according to a user input to the first display device, and controls the display unit to output the UI as the content-sharing mode is set, and sequentially change the content played by the first display device based on the order in which the second user identification information is arranged, if a preset input is received, wherein the preset input is a command which, when the content-sharing mode is not set, is a command for changing a channel to select the content played by the first display device.

The first display device may further include view history information that corresponds to the second user identification information, wherein the UI displayed on the first display device includes the view history information.

According to an aspect of another exemplary embodiment, a server includes: a communication unit for receiving first user identification information of a first user from a first display device, receiving second user identification information of a second user and playback content identification information of content that is being played by the second display device from a second display device; and a control unit for calculating a closeness between the first user and the second user, and generating electronic content guide information that is arranged based on the closeness value, wherein the communication unit transmits electronic content guide information to the first display device, and the content guide information includes the second user identification information and the playback content identification information that corresponds to the second user identification information.

The closeness value may be determined based on a result of comparing at least one piece of information selected from the group consisting of a type of preferred content, personal information, and view history information, between the first user and the second user.

The electronic content guide information may further include view history information that corresponds to the second user identification.

According to an aspect of another exemplary embodiment, a non-transitory computer-readable recording storage medium has stored thereon a computer program, which when executed by a computer, performs one of the methods described above.

BRIEF DESCRIPTION OF THE DRAWINGS

These and/or other exemplary aspects and advantages will become apparent and more readily appreciated from the following description of exemplary embodiments, taken in conjunction with the accompanying drawings in which:

FIG. 8 is a conceptual map of electronic content guide information according to an exemplary embodiment;

FIG. 10 illustrates an example of setting a content-sharing mode for the display device, which is performed by a user, according to an exemplary embodiment;

DETAILED DESCRIPTION

Figure 1:
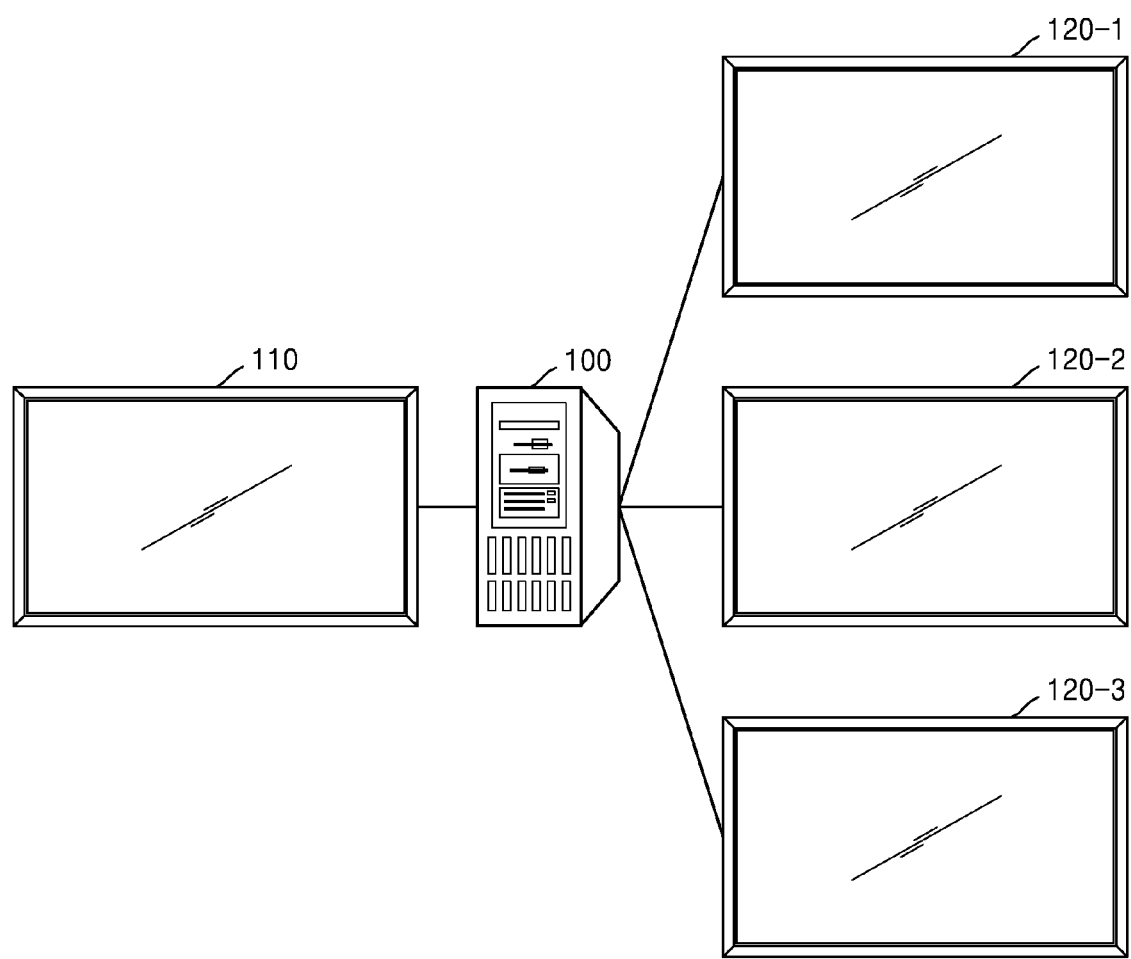
FIG. 1 is a conceptual map of a system that includes a display device and a server according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the description of embodiments, certain detailed explanations of the related art are omitted when it is deemed that they may unnecessarily obscure the essence of the embodiments Like numbers refer to like elements throughout the description of the figures. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected to" or "coupled to" another element, it may be "directly connected or coupled" to the other element, or "electrically connected to" the other element with intervening elements therebetween. Additionally, when an element is referred to as being "connected to" or "coupled to" another element, it may communicate with the other element through signal transmission or reception.

It will be further understood that the terms "comprises", "comprising", "includes", and/or "including" when used herein, specify the presence of components, but do not preclude the presence or addition of one or more other components, unless otherwise specified.

The terms used in the present specification are merely used to describe particular embodiments, and are not intended to limit embodiments of the inventive concept. General and widely-used terms have been employed herein, in consideration of functions provided in the inventive concept, and may vary according to an intention of one of ordinary skill in the art, a precedent, or emergence of new technologies. Additionally, in some cases, an applicant may arbitrarily select specific terms. Then, the applicant will provide the meaning of the terms in the description of the inventive concept. Accordingly, It will be understood that the terms, used herein, should be interpreted as having a meaning that is consistent with their meaning in the context of the relevant art and will not be interpreted in an idealized or overly formal sense unless expressly so defined herein.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

An application, as referred to in the description of embodiments, is a set of computer programs designed for executing a particular operation or job based on a connection between devices that will be described later. For example, applications provided in the description of embodiments may include any of various applications, for example, a game application, a musical instrument-playing application, a video playback application, a music playback application, a map application, a broadcast application, a fitness support application, a medical application, a payment application, an automatic navigation application for a transportation medium such as a car, a bus, an airplane, or a ship, a peripheral control application, or a combination thereof.

Hereinafter, the inventive concept will be described more fully with reference to the accompanying drawings, in which exemplary embodiments are shown.

FIG. 1 is a conceptual map of a system that includes display devices, namely, a first display device 110 and second display devices 120-1 through 120-3, and a server 100 according to an exemplary embodiment.

The first display device 110 and the second display devices 120-1, 120-2, and 120-3 are devices that may play content and perform data communication. For example, each of the first display device 110 and the second display devices 120-1, 120-2, and 120-3 may be implemented in any of various forms, such as a television (TV), a cellular phone, a smartphone, a personal digital assistant (PDA), and a digital multimedia broadcasting (DMB) reception device. However, the display devices are not limited thereto.

According to an exemplary embodiment, the first display device 100 may log on to the server 100 by transmitting first user identification information to the server 100.

As shown in FIG. 1, there may be a plurality of second display devices 120-1 through 120-3. However, a controlling method and a configuration of only the second display device 120-1 are described for convenience of description. A description of the second display device 120-1 may be also applied to the second display devices 120-2 and 120-3. According to an exemplary embodiment, the second display device 120-1 may log on to the server 100 by transmitting second user identification information to the server 100.

Additionally, in the description of the specification, the first display device 110 may perform the functions of the second display device 120-1. The second display device 120-1 may perform the functions of the first display device 110.

According to an exemplary embodiment, the second display device 120-1 may transmit playback content identification information to the server 100. The playback content identification information is content identification information for identifying content that is being played on the device transmitting the playback content identification information. For example, if the second display device 120-1 is a TV, and a TV broadcasting program is played on the second display device 120-1, channel information for identifying the channel for receiving the TV broadcasting program may be transmitted from the second display device 120-1 to the server. As another example, if the second display device 120-1 plays a video clip using a video on demand (VOD) service, the second display device 120-1 may transmit location information, such as a uniform resource location (URL) for identifying a location of the video clip, to the server. In other words, content identification information refers to information that may identify content, such as channel information or location information of the content. However, playback content identification information is not limited thereto, and any information for identifying content may be included in playback content identification information.

The server 100 may generate electronic content guide information that includes the playback content identification information received from the second display apparatus 120-1. The server 100 may transmit the generated electronic content guide information to the first device 110. The electronic content guide information may include profile information that is information about a user of the second display device 120-1. If a plurality of second display devices 120-1 are present, the electronic content guide information may include a user list. Additionally, information about a user of the second display device 120-1 may include second user identification information received from the second display device 120-1. According to an exemplary embodiment, playback content identification information included in the electronic content guide information may match the second user identification information. Second user identification information that corresponds to the first user identification information may refer to second user identification information of a second user who has a relationship with a first user identified by the first user identification information. For example, the server 100 may generate electronic content guide information in a database of the server 100, wherein the electronic content guide information includes playback content identification information about content played by the second display device 120-1, which logs on to the server 100 by using second user identification information of a second user who has a friend relationship with a first user identified by the first user identification information.

Alternatively, the server 100 may generate electronic content guide information that includes playback content identification information received from a display device of a user whose relationship is set in a separate social network service.

The first display device 110 may output a user interface (UI) for selecting content, based on the electronic content guide information received from the server 100. If playback content identification information included in the electronic content guide information is selected by using the UI, the first display device 110 may play content that corresponds to the playback content identification information. For example, if a user 1 selects a user 2 displayed on the first display device 110 of the user 1, a broadcasting program which is the same as a program played by a second display device of the user 2 may be played by the first display device.

Figure 2:
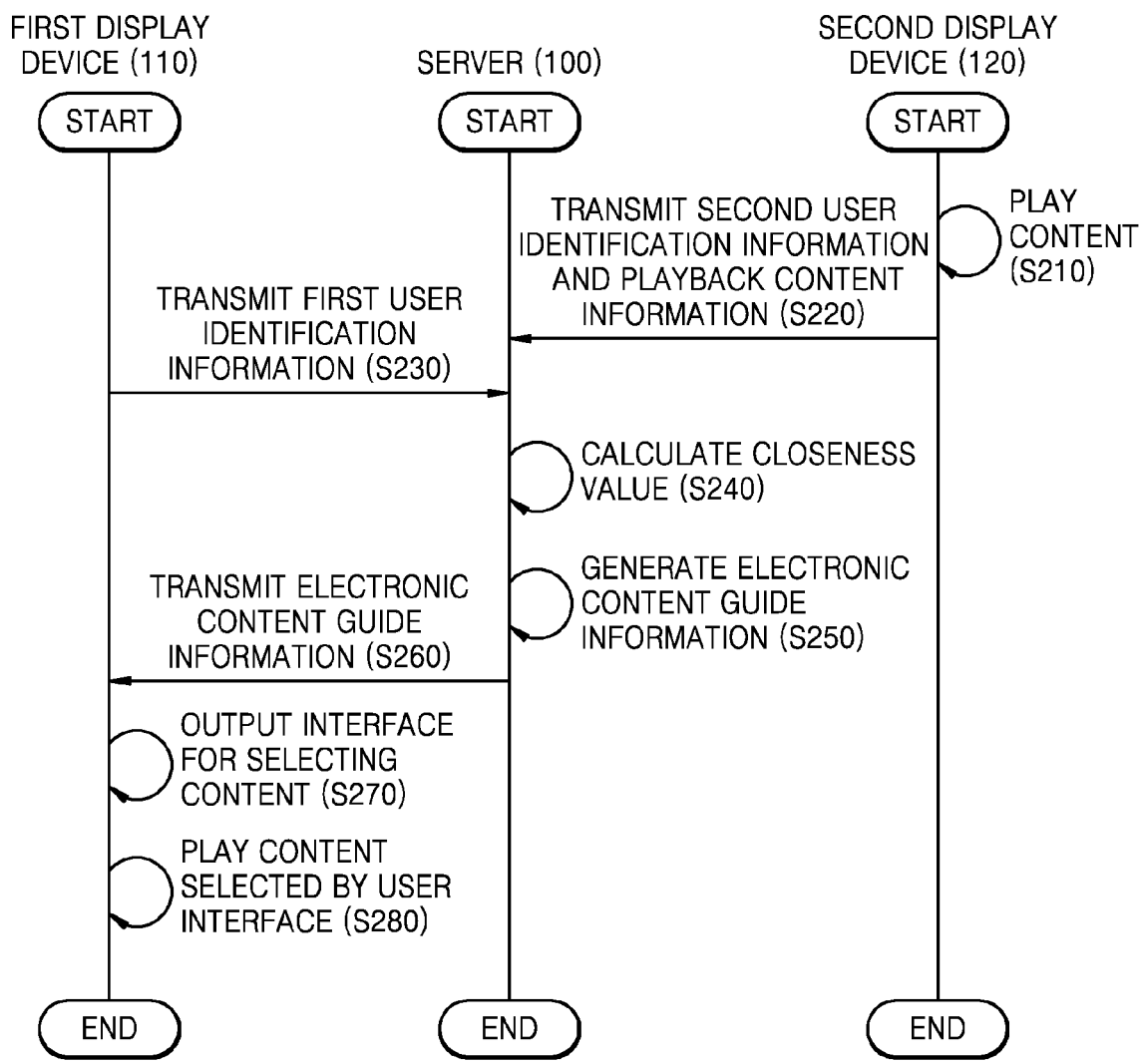
FIG. 2 illustrates a process of providing electronic content guide information, and playing content which is performed by the display device, according to an exemplary embodiment.

FIG. 2 illustrates a process of providing electronic content guide information and playing content, which is performed by a display device, according to an exemplary embodiment.

In operation S210, a second display device 120 plays content.

The content may be any of various types of content such as video content (for example, a TV program, VOD content, user-created content (UCC), a music video clip, a Youtube video clip, or the like), still image content (for example, a photograph, a picture, or the like), text content (for example, an e-book for a poem or a novel, a letter, a work file, a web page, or the like), music content (for example, music, a musical program, a radio broadcast, or the like), or an application (for example, a widget, a game, a video phone call, or the like).

Then, in operation 5220, the second display device 120 transmits the second user identification information and the playback content information to the server 100. The second user identification information may be a user identification (ID) for logging on to the server 100. The second display device 120 may log on to the server 100 by transmitting the second user identification information to the server 100. Additionally, the second user identification information may match the playback content information received from the second display device 120.

According to an exemplary embodiment, the second display device 120 may identify content through a process of image recognition with respect to an image included in the content that is played in operation S210, and the second display device 120 may transmit the playback content information, thus identified, to the server 100. According to another exemplary embodiment, the second display device 120 may identify content through a process of voice recognition with respect to voice included in the content that is played in operation S210, and the second display device 120 may transmit playback content information, thus identified, to the server 100. According to another exemplary embodiment, the second display device 120 may identify content based on a comparison with an electronic program guide received from a content provider, and the second display device 120 may transmit playback content identification information thus identified.

According to an exemplary embodiment, the server 100 may further obtain information about a type of content played by the first display device 110 or the second display device 120, a viewing rate of the content, and/or a content preference. A type of content played by a display device may refer to, for example, information about a type of content corresponding to a video clip played by the second display device 120, from among types including a movie, a soap opera, and news. A viewing rate of content refers to a ratio of the time during which the content has been viewed to a total playing time for the content. For example, if a total playing time of video clip content is 2 hours and the video clip content is played by a display device for 1 hour, a viewing rate of content may be 50%. A content preference may be a degree to which a user prefers the content. For example, the preference of content may be a rating input by a user with respect to the content.

Then, in operation S230, the first display device 110 may transmit the first user identification information to the server 100. The first user identification information may be a user ID for logging on to the server 100.

Then, in operation S240, the server 100 may calculate a closeness value with respect to closeness between the first user identification information and the second user identification information. According to an exemplary embodiment, the server 100 may calculate a closeness value based on information about content or information about a user.

A closeness value may be calculated by using any of various methods according to exemplary embodiments. For example, a closeness value may be calculated by determining a ranking value with respect to users according to priority criteria or providing a weighted value according to priority criteria. As a detailed example, priority criteria may be determined in an order of i) the number of times which a response to the same content is input at the same point of time or within the same time period, ii) the number of times which the same content is viewed, iii) the number of times which the same content is viewed at a same time, iv) the number of times which content in the same category is viewed, v) the number of people who are commonly registered as a friend by the two users, and vi) a duration of time for which arbitrary content is viewed at the same time. The server 100 may determine a ranking of users in closeness according to a high priority, and determine again a ranking of users, who are in a same ranking, in closeness according to next priority criteria. Alternatively, the server 100 may determine a closeness value by giving a weighted value to each criterion according to a priority, and totaling values obtained by multiplying a point according to each criterion by the weighted value. However, embodiments are not limited thereto.

The information about content may include view history information that is information about content played by the first display device 110 and the second display device 120. The view history information may include content identification information, a type of content, a viewing rate of content, or a preference of a first user and a second user for content, in correspondence with to content viewed in the past. In other words, the server 100 may calculate a value of a degree, in which types of contents played by the first display device 110 and the second display device 120, viewing rates of the contents, or a preference of a first user and a second user for the contents match each other, as a closeness value. A type of content played by a display device may refer to, for example, information about a type of a video clip, from among a movie, a soap opera, and news, which is played by the second display device 120. A viewing rate of content refers to a time during which the content has been viewed as compared to a total time of the content. For example, if a total playing time of video clip content is 2 hours and the video clip content is played by a display device for 1 hour, a viewing rate of the content may be 50%. A preference of content may be a degree to which a user prefers the content. For example, a preference of content may be a rating input by a user with respect to the content.

Information about a user may include the number of times which a first user references playback content of the second user, a residence area of a user, an age of a user, a gender of a user, or a job of a user. In other words, the server 100 may calculate the number of times which a first user references playback content of the second user or a degree to which a residence area, an age, a gender, or a job of the first user match those of the second user, as a closeness value. The number of times which the first user references playback content of the second user refers to the number of times which the first display device 110 plays content, previously played by the second display device 120, by performing an operation that corresponds to operation S280 to be described with reference to FIG. 2. A residence area, an age, a gender, and a job of a user is personal information of the user and may be information transmitted from a display device to a server, or information that matches user identification information and is thus stored in a server.

Then, in operation S250, the server may generate electronic content guide information based on the closeness value. According to an exemplary embodiment, the server 100 may arrange electronic content guide information in an order of the size of a closeness value. For example, if a closeness value that corresponds to second user identification information is 80, a closeness value that corresponds to third user identification information is 60, and a closeness value that corresponds to fourth user identification information is 70, the server 100 may arrange user identification information included in the electronic content guide information in an order of the second user identification information, the fourth user identification information, and the third user identification information. In other words, if a user list is included in the electronic program information, the user list may be arranged based on a closeness value.

Then, in operation S260, the server 100 may transmit the generated electronic content guide information to the first display device 110.

According to an exemplary embodiment, electronic content guide information transmitted to the first display device 110 may include second user identification information and playback content identification information that matches the second user identification information. According to another exemplary embodiment, electronic content guide information may further include view history information that is history of content played by the second display 120. According to another exemplary embodiment, electronic content guide information may further include a list of users who are playing content that corresponds to playback identification information, a list of users who have played content included in view history information, and metadata of content included in the electronic content guide information. Metadata of content refers to information such as a preview image or a thumbnail of content, but is not limited thereto.

Then, in operation S270, the first display device 100 may output a UI for selecting content. A UI for selecting content may be implemented in a variety of ways.

According to an exemplary embodiment, the UI for selecting content may display a part of a user list included in electronic content guide information. The first display device 100 may display a user list in which users are arranged according to an order of closeness, or a part of the user list according to an order of the second user identification information. The first display device 110 may display user identification information included in the user list. Alternatively, the first display device 110 may display profile information that corresponds to user identification information included in the user list. Profile information refers to information about a user such as a name, a picture, or a nickname of the user. According to an exemplary embodiment, the first display device 110 may display various information via which the user may identify a user of the second display device 120.

Additionally, according to another exemplary embodiment, the UI for selecting content may further display at least one selected from a group consisting of view history information that corresponds to the second user identification information, a list of users who are playing content that corresponds to playback identification information, a list of users who played content included in the view history information, and metadata of content included in electronic content guide information.

Then, in operation S280, the first display device 110 plays content selected by using the UI.

According to an exemplary embodiment, the user may select an object that corresponds to the second user identification information from the user list that is displayed in operation S270. When the object that corresponds to the second user identification information is selected, the first display device 110 selects content by using playback content identification information that matches the second user identification information in operation S280. By playing the selected content, the first display device 110 plays the same content that is played by the second display device 120. In other words, for example, a first user may view via a TV of the first user the same broadcasting program that is viewed by a second user, who is registered as a friend of the first user, via a TV of the second user.

According to another exemplary embodiment, a user may select an object that corresponds to at least one piece of content identification information selected from the view history information displayed in operation S270. When the object that corresponds to the at least one piece of content identification information is selected, the first display device 110 may select content by using content identification information that corresponds to the selected object. By playing the selected content, the first display device 110 may play content that has history of being played by the second display device 120. In other words, for example, a first user may view the same content as was previously viewed by a second user, who is registered as a friend of the first user, through a TV of the second user.

According to another exemplary embodiment, in operation S270, a UI may not be displayed directly on a screen of the first display device 110. In this case, although not illustrated in FIG. 2, setting of a content-sharing mode according to a user input, which is performed by the first display device 110, may be further included. When the content-sharing mode is set, if a preset input is received, the display device 110 may sequentially display content, played by the first display device 110, according to an order of content arranged based on the closeness value. For example, after the user sets the content-sharing mode by making an input by pressing a button of a remote controller or using voice recognition with respect to a TV, whenever the user presses a channel button of the remote controller, the TV may flip through contents that are being played by respective display devices of other users in an order determined by who of the other users respectively has a highest closeness value, a second highest closeness value, and a third highest closeness value, etc.

Figure 3:
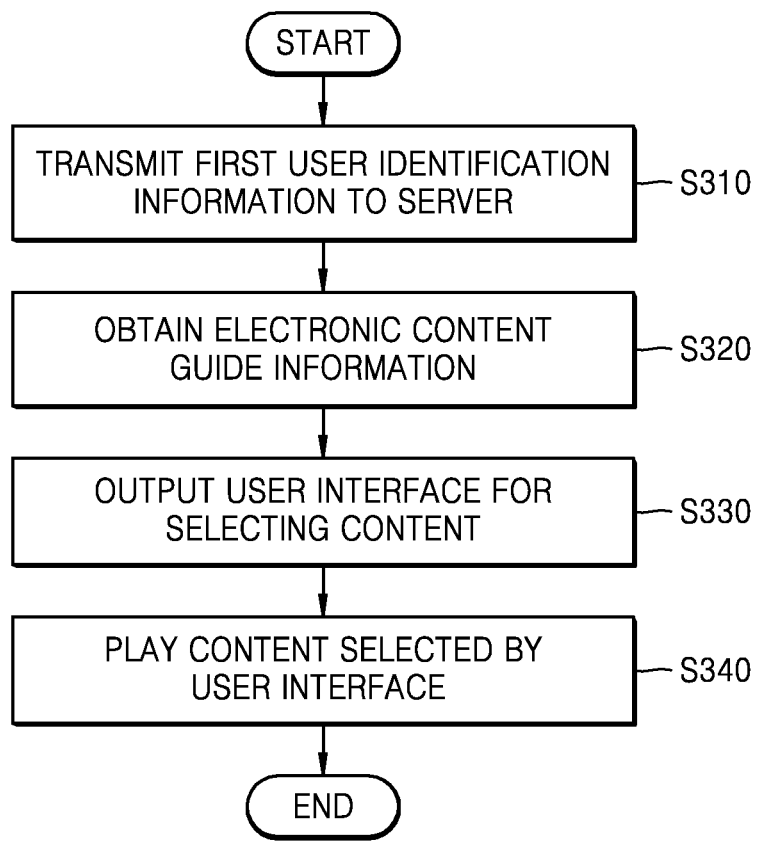
FIG. 3 is a flowchart of a process of controlling the display device, according to an exemplary embodiment.

FIG. 3 is a flowchart of a process of controlling a display device, according to an exemplary embodiment.

In operation S310, the display device transmits first user identification information to a server. Then, the display device may obtain electronic content guide information that includes second user identification information that corresponds to the first user identification and playback content identification information that matches the second user identification information. The display device may receive the electronic content guide information from the server, or may separately receive information that is to be included in electronic content guide information and thus generate the electronic content guide information. The second user identification information that corresponds to the first user identification information may refer to user identification information of a second user who has a friend relationship with the first user identified by the first identification information. Additionally, the electronic content identification information may include second user identification information that is arranged in an order determined by a closeness value with respect to closeness between the first user identification information and the second user identification information. A closeness value may be determined based on a result of comparing at least one selected from a group consisting of a type of preferred content, personal information, and view history information, which respectively correspond to the first user identification information and the second user identification information, between the first user identification information and the second user identification information.

According to an exemplary embodiment, the electronic content guide information received in operation S320 may further include view history information that corresponds to the second user identification information. View history information may include information about a history of content that was played in the past by a display device that logged in to a server by using the second user identification information.

Then, in operation S330, the display device outputs a UI for selecting content based on the electronic content guide information obtained in operation S320. The UI may include an object for selecting user identification information or content identification information. The content identification information may include playback content identification information. The playback content identification information is information for identifying content that is currently being played by a display device that logs in to the server by using the second user identification information. The UI for selecting content may be modified in a variety of ways according to exemplary embodiments.

According to an exemplary embodiment, the UI may include an object for displaying profile information that corresponds to the second user identification information. As the object for displaying profile information that corresponds to the second user identification information is selected, the display device may select content by using playback content identification information that corresponds to second user identification information of the selected object.

According to an exemplary embodiment, the display device may alternate among second user identification information, selected by using a channel change button, in an order determined by a closeness value. According to another exemplary embodiment, if the display device recognizes the voice of a user such as 'previous' or 'next', the display device may select previous second user identification information or next second user identification information, accordingly. According to another exemplary embodiment, the display device may recognize a gesture of a user and select previous second user identification information or next second user identification information based on the recognized gesture. According to another exemplary embodiment, the display device may select second user identification information in a previous order or second user identification information in a next order, based on an input received according to a direction in which a remote controller is tilted.

According to another exemplary embodiment, a UI may include an object for displaying a view history that corresponds to the second user identification information. As one piece of history information of the displayed view history is selected, the display device may select the content that corresponds to the selected information in the view history.

In operation S330, the UI may be displayed in an order determined by the second user identification arranged according to a closeness value. For example, the display device may sequentially display profile information of users in an order of high closeness.

Then, in operation S340, the display device plays the content, selected in operation S330, by using the displayed UI.

Figure 4:
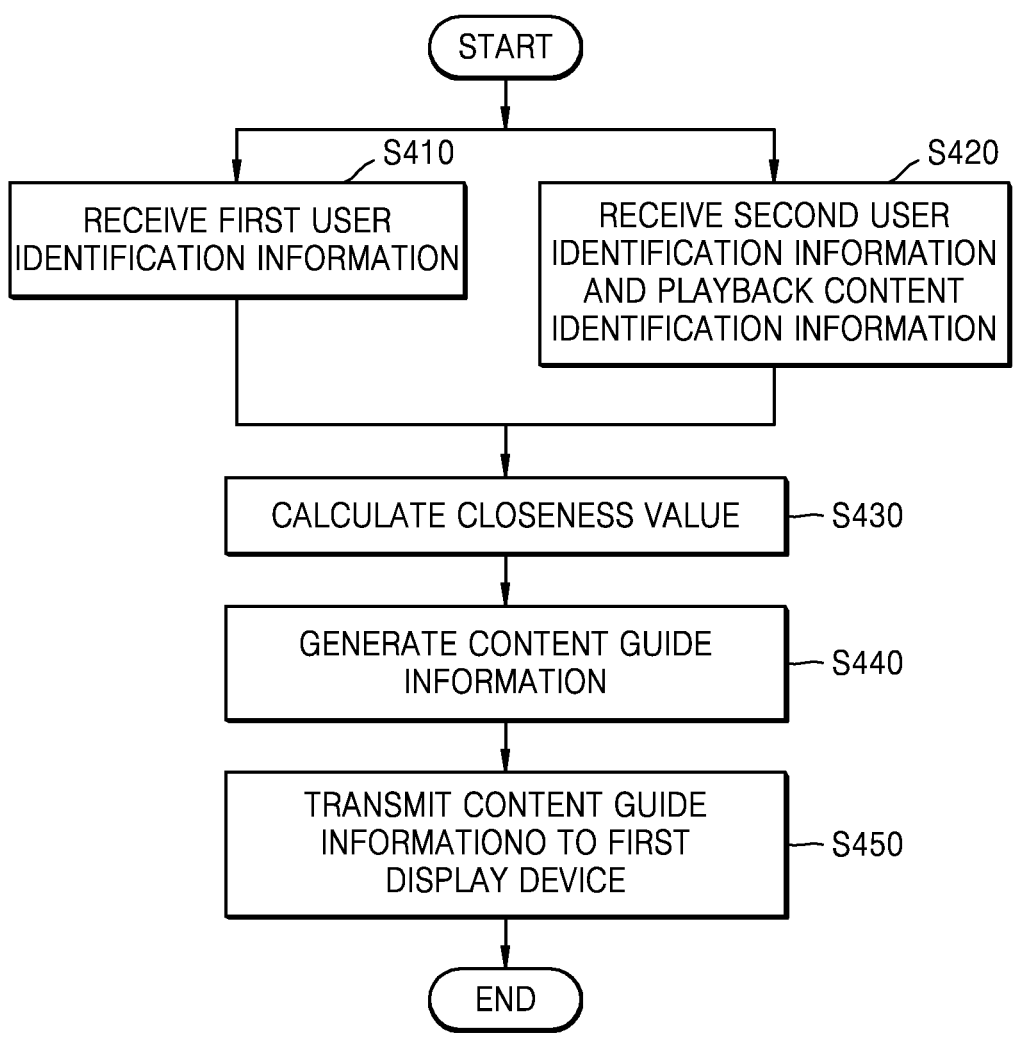
FIG. 4 is a flowchart of a process of controlling a server, according to an exemplary embodiment.

FIG. 4 is a flowchart of a process of controlling a server, according to an exemplary embodiment.

In operation S410, the server receives first user identification information from a first display device. In operation S420, the server receives second user identification information and playback content identification information from a second display device. Operations S410 and S420 may or may not be simultaneously performed.

According to an exemplary embodiment, the server may store the playback content identification information received from the second display device and generate or update view history information that includes history of the received playback content identification information.

Then, in operation S430, the server calculates a closeness value of a closeness between first user identification information and the second user identification information. A closeness value may be calculated in a variety of ways according to exemplary embodiments. According to an exemplary embodiment, a closeness value may be determined based on a result of comparing at least one selected from a group consisting of a type of preferred content, personal information, and view history information, between the first user identification information and the second user identification information.

Then, in operation S440, the server generates content guide information that includes second user identification information which is arranged in an order based on the closeness value calculated in operation S430. Additionally, the content guide information may further include playback content identification information that corresponds to the second user identification information. According to exemplary embodiments, electronic content guide information may further include at least one selected from a group consisting of view history information that corresponds to the second user identification information, profile information that corresponds to the second user identification information, and metadata of content.

Then, in operation S450, the server transmits the electronic content guide information, generated in operation S440, to the first display device.

Figure 5:
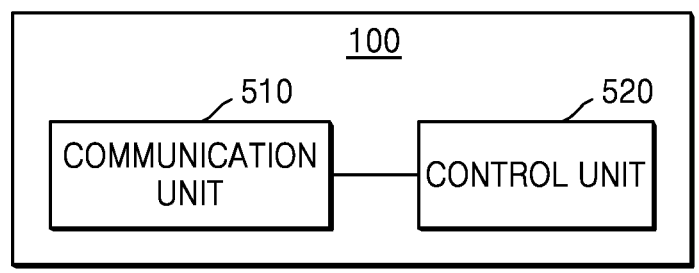
FIG. 5 is a brief block diagram of the server according to an exemplary embodiment.

FIG. 5 is a brief block diagram of a server according to an exemplary embodiment. FIG. 5 is a diagram for explaining an exemplary embodiment, and the server may include more elements than shown in FIG. 5, or may include another element substituting a function of an element shown in FIG. 5.

According to an exemplary embodiment, the server may further include a communication unit 510 for communicating with each element of the server or with the outside, and a control unit 520 for controlling each operation of the server. The control unit 520 may include at least one processor.

The communication unit 510 may receive first user identification information from a first display device and receive second user identification information and playback content identification information of content, which is being played by a second display device, from the second display device.

The control unit 520 may calculate a closeness value of a closeness between the first user identification information and the second user identification information and generate electronic content guide information that is arranged in an order based on the value of the closeness. The electronic content guide information may include the second user identification information that is arranged in an order based on the closeness value, and playback content identification information that matches the second user identification information.

The electronic content guide information, generated by the control unit 520, may be transmitted to the first display device via the communication unit 510.

Figure 6:
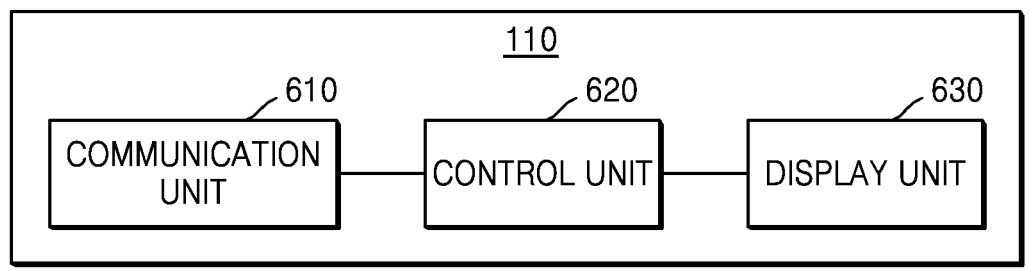
FIG. 6 is a brief block diagram of the display device according to an exemplary embodiment.

FIG. 6 is a brief block diagram of a display device according to an exemplary embodiment. FIG. 6 is a diagram for explaining an exemplary embodiment, and the display device may include more elements than shown in FIG. 6, or may include another element substituting a function of an element shown in FIG. 6.

According to an exemplary embodiment, the display device may include a communication unit 610 for communicating with each element of the display device or with the outside, the control unit 620 for controlling each operation of the display device, and a display unit 630 for displaying on a screen.

The communication unit 610 may transmit first user identification information to a server. The control unit 620 may obtain second user identification information, which corresponds to first user identification information, and electronic content guide information, which includes playback content identification information that matches the second user identification, via the communication unit 610.

The display unit 630 may display a UI for selecting content that corresponds to the playback content identification information, based on the obtained electronic content guide information. The control unit 620 may select content based on a user input to the UI and may play the selected content.

Figure 7:
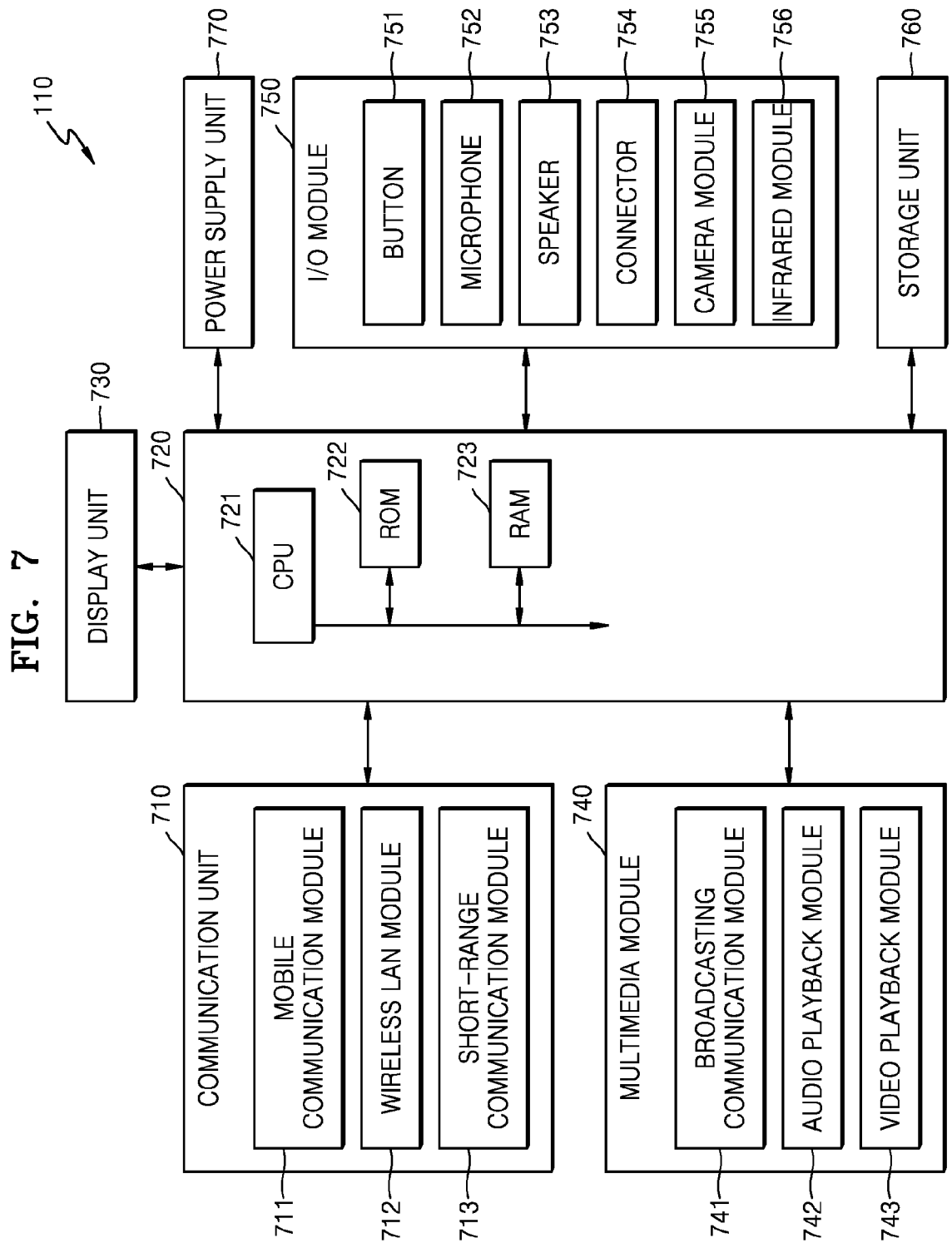
FIG. 7 is a block diagram of the display device according to an exemplary embodiment.

FIG. 7 is a block diagram of the display device 100 according to an exemplary embodiment. FIG. 7 only shows a diagram of a display device according to an exemplary embodiment. However, the display device may include more or less elements than shown in FIG. 7.

The display device 110 may be connected to an external device (not illustrated) using a communication 710 or a connector 754. The external device may include at least one element selected from a group consisting of another device (not illustrated), a cellular phone (not illustrated), a smartphone (not illustrated), a tablet personal computer (PC) (not illustrated), and a server (not illustrated).

The display device 100 may include a display unit 730, a control unit 720, the communication unit 710, a multimedia module 740, an input/output (I/O) module 750, a storage unit 760, and a power supply unit 770. The communication unit 710 may include at least one element selected from a group consisting of a mobile communication module 711, a wireless local area network (LAN) module 712, a short-range communication module 713, and a wired communication module (not illustrated). The multimedia module 740 may include at least one element selected from a group consisting of a broadcasting communication module 741, an audio playback module 742, and a video playback module. The I/O module 750 may include at least one selected from the group consisting of a button 751, a microphone 752, a speaker 753, the connector 754, a camera module 755, and an infrared module 756.

The control unit 720 may include a central processing unit (CPU) 721, read-only memory (ROM) in which a control program for controlling the display device 110 is stored, random-access memory (RAM) 723 that stores a signal or data input from outside the display device 110 or is used as a memory region through which an operation is performed by the display device 100. The CPU 721 may include a plurality of processors such as a single-core, a dual-core, a triple-core, or a quad-core processor. The CPU 721, the ROM 722, and the RAM 723 may be connected to each other via an internal bus.

The control unit 720 may control the communication unit 710, the display unit 730, the multimedia module 740, and the I/O module 750, the storage unit 760, and the power supply unit 770.

The mobile communication module 711 may connect the display device 110 to an external device via mobile communication by using at least one antenna (one or more antennas) (not illustrated), according to control by the control unit 720. The mobile communication module 711 may receive/transmit a wireless signal for transmitting/receiving a voice phone call, a video phone call, a short message service (SMS), or a multimedia message service (MMS) to/from a cellular phone (not illustrated), a smartphone (not illustrated), a tablet PC (not illustrated), or another device (not illustrated), which has a phone number that is input to the display device 110.

The wireless LAN module 712 may be connected to an internet service in an area in which a wireless access point (AP) is installed, according to a control by the control unit 720. The wireless LAN module 712 may support institute of electrical and electronic engineers (IEEE) 802.11x standards that are wireless LAN standards established by IEEE. The short-range communication module 713 may perform short-range communication between the display device 110 and an external device (not illustrated) that is located near the display device 110 according to control by the control unit 720. A short-range communication method may include Bluetooth, infrared data association (IrDA), or ZigBee. The wired communication module (not illustrated) may be connected to a wired communication network such as the Internet, by using wired communication.

The multimedia module 740 may include the broadcasting communication module 741, the audio playback module 742, and the video playback module 743. The broadcasting communication module 741 may receive a broadcasting signal (for example, a TV broadcasting signal, a radio broadcasting signal, or a data broadcasting signal) and additional broadcasting information (for example, an electronic program guide (EPG) or an electric service guide (ESG)) which are transmitted from a broadcasting station via a broadcasting communication antenna (not illustrated) according to control by the control unit 720. The audio playback module 742 may play a digital audio file stored or received according to control by the control unit 720. The video playback module 743 may play a digital video file stored or received according to control by the control unit 720. The video playback module 743 may play a digital audio file.

The I/O module 750 may include at least one element selected from a group consisting of a plurality of buttons 751, the microphone 752, the speaker 753, the connector 754, the camera module 755, and the infrared module 756.

The plurality of buttons 751 may be formed on a front surface, a side surface, or a rear surface of a housing of the display device 110, and may include at least one button selected from a group consisting of a power button (not illustrated), a volume button (not illustrated), a channel button (not illustrated), and a menu button (not illustrated).

The microphone 752 may receive voice or sound and generate an electrical signal according to control by the control unit 720.

The speaker 753 may output sound, which corresponds to various signals from the communication unit 710, the multimedia module 740, or the camera module 755, to the outside of the display unit 110, according to control by the control unit 720. The speaker 753 may output sound that corresponds to a function performed by the display device 110. A single speaker or a plurality of speakers 753 may be formed at an appropriate location or appropriate locations of a housing of the display device 110.

The connector 754 may be used as an interface for connecting the display device 100 to an external device (not illustrated) or a power source (not illustrated). The connector 754 may transmit data, stored in the storage unit 760 included in the display device 110, via a wired cable connected to the connector 754 or receive data from an external device (not illustrated) according to a control by the control unit 720.

The camera module 755 may include a camera for capturing a still image or a moving picture according to control by the control unit 720.

The infrared module 756 may receive a user input based on an infrared signal. For example, the infrared module 756 may receive an input from a remote controller.

The storage unit 760 may store a signal or data which is input/output in correspondence with operation of the communication unit 710, the multimedia module 750, the I/O module 750, or the display unit 730 according to control by the control unit 720. The storage unit 760 may store a control program and applications for controlling the display device 110 or the control unit 720.

A term "storage unit" may include the storage unit 760, the ROM 722 or the RAM 723 included in the control unit 720, or a memory card (not illustrated) equipped in the display device 110. The storage unit may include a non-volatile memory, a volatile memory, a hard-disk drive (HDD), or a solid-state drive (SSD).

The power supply unit 770 may supply power to at least one battery (not illustrated) disposed in a housing of the display device 110 according to control by the control unit 720. Additionally, the power supply unit 770 may supply power, input from an external power source (not illustrated), to each unit of the display device 110 via a wired cable connected to the connector 754.

The display unit 730 may output a UI, which corresponds to various services, to a user.

FIG. 8 is a concept map of electronic content guide information according to an exemplary embodiment.

According to an exemplary embodiment, electronic content guide information may include relevant user ID that is user identification information which may correspond to each of the four second display devices. Additionally, electronic content guide information may include a playback content ID that is playback content identification information for identifying content played by a second display device that corresponds to user identification information. The relevant user ID may be arranged according to an order of closeness between user001, user002, user003, and user004, and first user identification information that corresponds to a first display device. Referring to FIG. 8, user001 may correspond to user identification information that has a highest closeness as calculated with respect to first user identification information, and user004 may be user identification information that has a lowest closeness as calculated with respect to second user identification.

Figure 9:
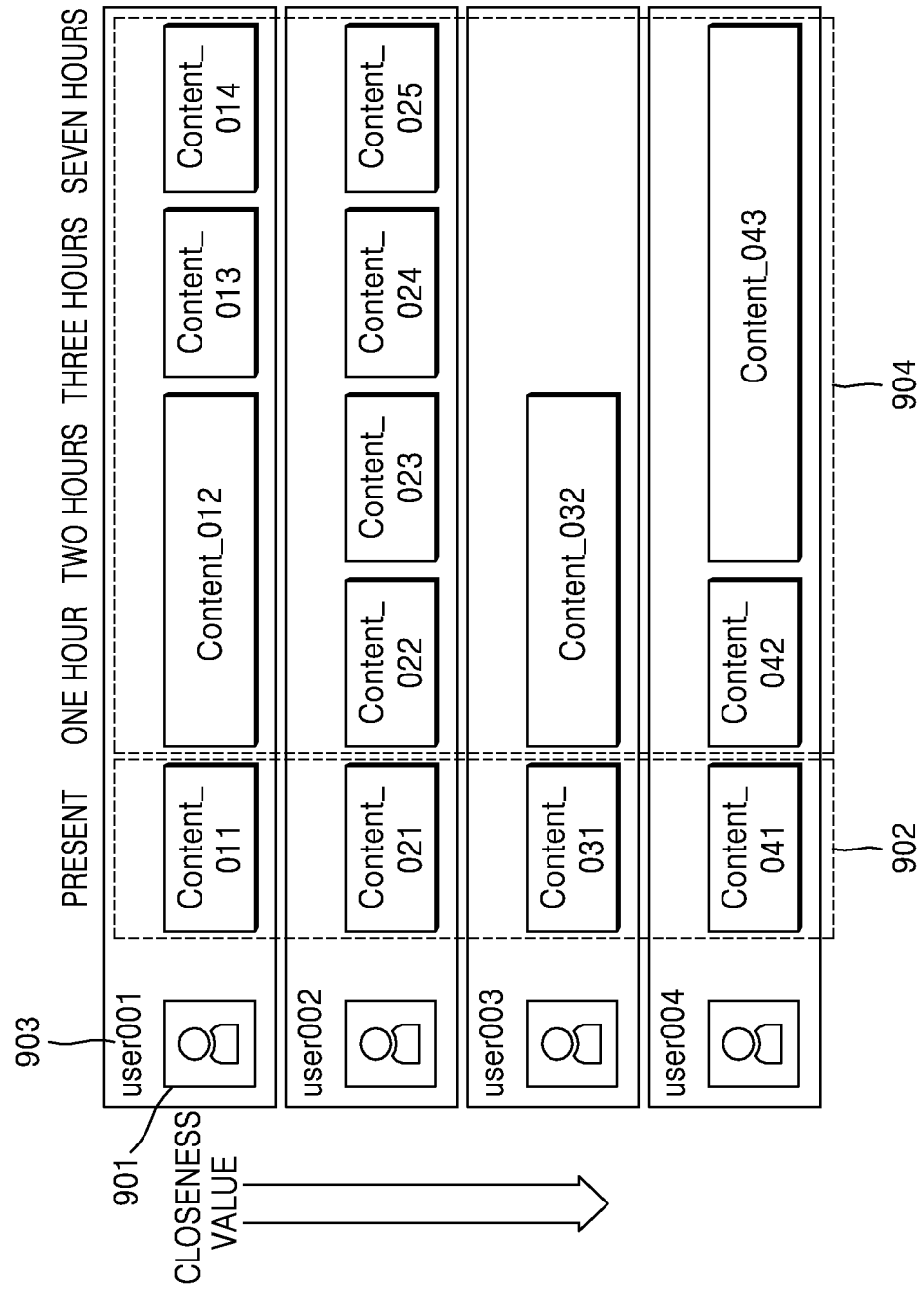
FIG. 9 is a conceptual map of electronic content guide information according to another exemplary embodiment.

FIG. 9 is a concept map of electronic content guide information according to another exemplary embodiment.

According to another exemplary embodiment, referring to FIG. 9, electronic content guide information may include profile information 901, playback content identification information 902, user identification information 903, and view history information 904. The user identification information 903 may be arranged in an order according to a closeness value.

The playback content identification information 902 includes information identifying content, which is being played by a display device that corresponds to the user identification information 903. Referring to FIG. 9, electronic content guide information shows that user 001 is viewing content that corresponds to Content_011. The electronic content guide information shows that user002, user003, and user004 are respectively viewing Content_021, Content_031, and Content_041.

The view history information 904 includes history of content that was played in the past by a display device that corresponds to the user identification information 903. Referring to FIG. 9, the electronic content guide information shows that user 001 viewed Content_012 for a period of time from three hours ago to one hour ago, Content_013 for a period of time from four hours ago to three hours ago, and Content_014 until four hours ago.

FIG. 10 illustrates an example of setting a content-sharing mode for the display device 110, which is performed by a user 1000, according to an exemplary embodiment.

Referring to FIG. 10, the user 1000 may set a content-sharing mode for the display device 110 by pressing a button included in a remote controller 1010. FIG. 10 shows a method of setting a content-sharing mode, according to an exemplary embodiment. Alternately, another method may be used to set a content-sharing mode.

When the content-sharing mode is set, the display device 110 may change content that is played by the display device 110 based on electronic content guide information.

Figure 11:
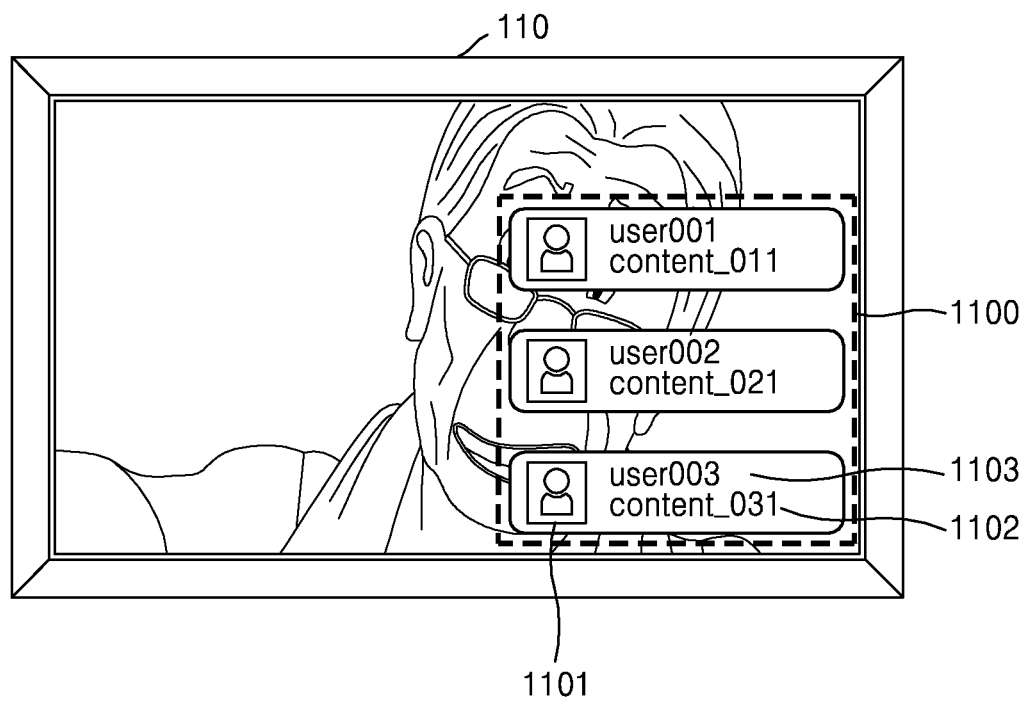
FIG. 11 illustrates an example of outputting a user interface (UI) for selecting content, which is performed by the display device, according to an exemplary embodiment.

FIG. 11 illustrates an example of outputting a UI for selecting content, which is performed by the display device 110, according to an exemplary embodiment.

According to an exemplary embodiment, as shown in FIG. 10, when the content-sharing mode is set, the display device 110 may display a UI 1100 for selecting content based on electronic content guide information. The UI 1100 may include profile information 1101 that corresponds to user identification information 1103, playback content information 1102 that corresponds to the user identification information 1103, and objects for displaying the user identification information 1103. Each object may be displayed according to an order in which the user identification information 1103 is arranged in the electronic content guide information.

As shown in FIG. 11, when the UI 1100 is displayed, if an object that corresponds to user002 is selected, the display device 110 may play content that corresponds to Content_021.

Figure 12:
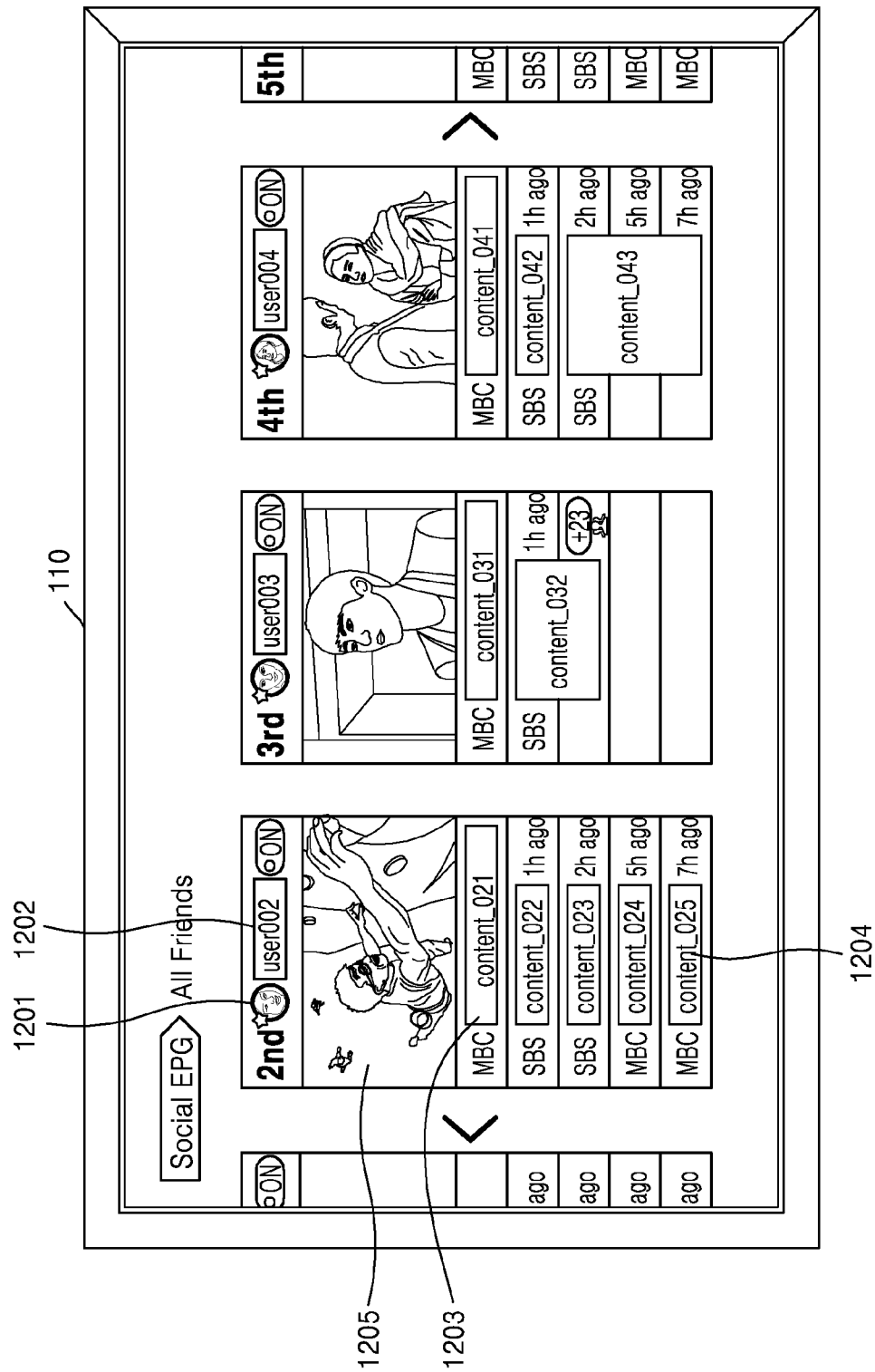
FIG. 12 illustrates an example of outputting a UI for selecting content, which is performed by a display device, according to another exemplary embodiment.

FIG. 12 illustrates an example of outputting a UI for selecting content, which is performed by the display device 110, according to another exemplary embodiment.

According to an exemplary embodiment, as shown in FIG. 10, when the content-sharing mode is set, the display device 110 may display a UI for selecting content based on electronic content guide information. According to an exemplary embodiment, the UI may include an object 1201 that corresponds to profile information, an object 1202 that corresponds to user identification information, an object 1203 that corresponds to playback content identification information, an object 1204 that corresponds to content view history information, and an object 1205 for displaying preview information of the content.

If the object 1203 that corresponds to playback content identification information is selected, the display device 110 may select content by using playback content identification information 'content_021' that corresponds to the selected object 1203 and play the selected content. If the object 1204 that corresponds to content view history information is selected, the display device 110 may select content by using playback content identification information 'content_025' that corresponds to the selected object 1204 and play the selected content.

According to exemplary embodiments, the UI may further display additional information such as a closeness ranking of user identification information or a view history showing the number of times which a friend made a reference to content.

Figure 13:
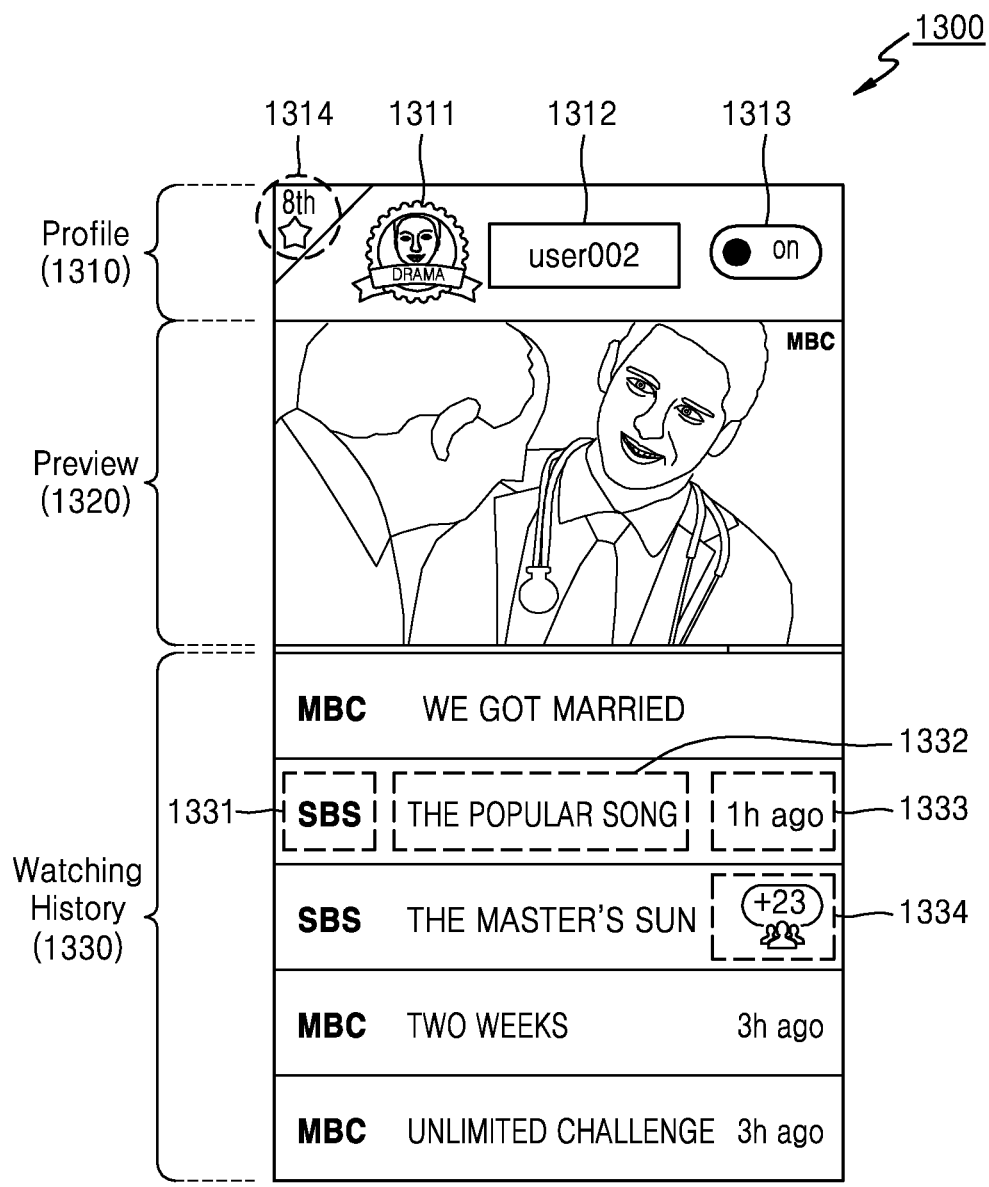
FIG. 13 is a detailed diagram of a part of a UI for selecting content according to some exemplary embodiments.

FIG. 13 is a detailed diagram of a part of a UI for selecting content, according to some exemplary embodiments.

According to some exemplary embodiments, the display device 110 may display a profile information display area 1310, a preview area 1320, and a view history area 1330 with respect to each user included in electronic content guide information. The display device 110 may display a plurality of UI objects 1300 that correspond to a plurality of users. Additionally, the display device 110 may sequentially display the plurality of UI objects 1300 according to a ranking of respective closeness values of users.

The profile information display area 1310 refers to an area in which profile information of a user, which corresponds to the plurality of UI objects 1300, is displayed. A profile image 1311, user identification information 1312, a connection state 1313, and a closeness ranking 1314, which correspond to the plurality of UI objects 1300, may be displayed on the profile information display area 1310. However, the profile information display area 1310 is not limited thereto.

The profile image 1311 may be an image registered by a user. Alternatively, the profile image 1311 may include a badge of a user. A badge may be an image showing a category of content. If the number of users, who select the user corresponding to the badge and use content in a category, is equal to or greater than a threshold value, the display device 110 may display a badge that represents the category. For example, if five or more users select 'user002' to view a soap opera, the display device 110 may display the profile image 1311 that includes a badge indicating the soap opera.

The user identification information 1312 may refer to information for identifying a user corresponding to the UI object 1300. For example, the user identification information 1312 may be an ID, a name, or a nickname for logging in to a content view service.

The connection state 1313 may be information indicating whether a user that corresponds to the UI object 1300 is connected to the content view service.

The closeness ranking 1314 may be information indicating a ranking of a closeness value with respect to closeness between the user corresponding to the UI object 1300 and a user of the display device 110.

A preview image of selected content may be displayed on the preview area 1320. A preview image may be an image generated according to an operation for expressing interest of the user corresponding to the UI object 1300 with respect to content. An operation for expressing interest with respect to content may be, for example, an operation of capturing a content output screen or an operation of inputting a command for generating a highlight image that includes some segments of the content.

With respect to content viewed by a user who corresponds to the UI object 1330, at least one item selected from a group consisting of broadcasting station information 1331, a title 1332, a time of viewing content 1333, and the number 1334 of users who viewed content may be displayed in the view history display area 1331. When one of the contents displayed in the view history display area 1331 is selected, a preview image of the selected content is displayed on the preview area 1320, or the selected content may be displayed on the whole screen of the display device 110. Alternatively, if a user of the display device 110 does not have authority to access selected content, the display device 110 may output a screen in which an authority for the selected content may be purchased.

Figure 14:
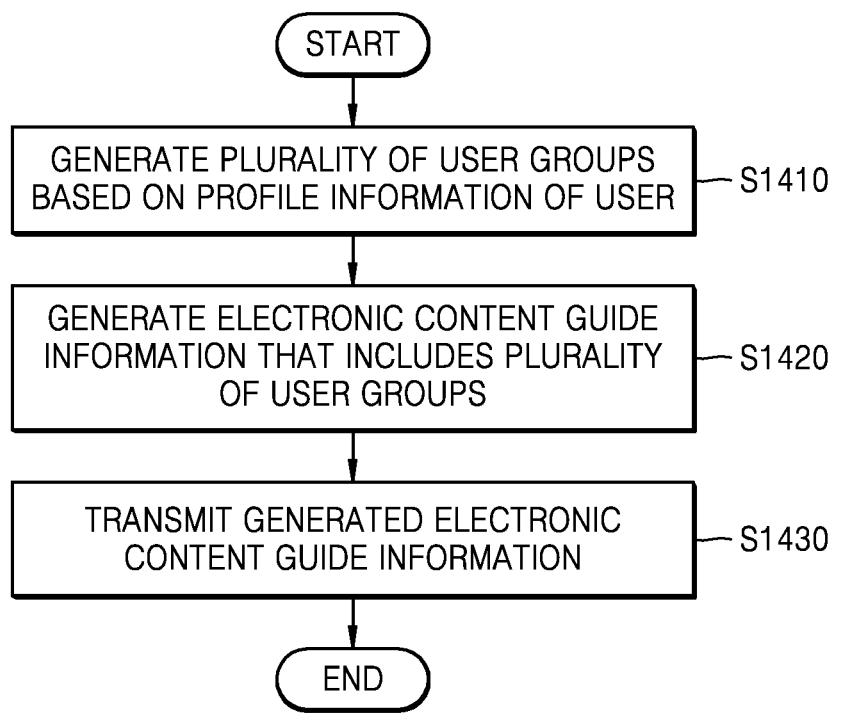
FIG. 14 is a flowchart of a process of providing electronic content guide information, which is performed by a server, according to some exemplary embodiments.

FIG. 14 is a flowchart of a process of providing electronic content guide information, which is performed by the server 100, according to some exemplary embodiments. According to some exemplary embodiments, the server 100 may generate content guide information based on a process shown in FIG. 14, instead of operations S430 and S440 shown in FIG. 4.

The server 100 may obtain profile information about a plurality of users. Profile information about a plurality of users may be information stored in the server 100, or information about users of the first display device 110 and the second display devices 120-1 through 120-3, which are connected to the server 100. For example, profile information may include at least one selected from the group consisting of an age, a gender, a residence area, a type of preferred content, an interest, and a current feeling.

In operation S1410, the server 100 generates a plurality of user groups based on profile information of users. If a number of users that have profile information similar to each other is equal to or greater than an arbitrary threshold value, the server 100 may generate a user group based on the similar profile information. For example, if two or more users from among users of the second display devices 120-1 through 120-3, whose age is equal to or greater than 30 and equal to or less than 39 and whose hobby is golfing or who has viewed a golf-related broadcasting program, are present, the server 100 may generate a user group of "golfers in their 30s".

Then, in operation S1420, the server 100 generates electronic content guide information that includes a plurality of user groups generated in operation S1410. If the plurality of user groups include a first user group and a second user group, the electronic content guide information may include information about content that corresponds to the first user group, and information about content that corresponds to the second user group. Information about content that corresponds to a user group may be identification information identifying content that was viewed or is being viewed by a user in the first user group. Alternatively, information about content that corresponds to a user group may be identification information for identifying content recommended according to characteristics of the user group, but is not limited thereto. For example, if a user group consists of "people in their 20s who want to travel", information about content that corresponds to the user group may be information indicating a broadcasting program related to travelling.

Then, in operation S1430, the server 100 transmits the generated electronic content guide information to the first display device 110. The first display device 110 may display a plurality of user groups included in the electronic content guide information. A user may input to the first display device 110 to select at least one group of the displayed plurality of user groups (for example, by using a remote controller). After receiving an input from the user, the first display device 110 may output content that corresponds to the selected user group via a display unit. According to some exemplary embodiments, a UI that is displayed on the first display device 110 may be a name of the user group which is substituted for the object 1202 that corresponds to user identification information shown in FIG. 12. Alternatively, according to other exemplary embodiments, a UI displayed on the first display device 110 may have a form shown in FIG. 16, but is not limited thereto.

Figure 15:
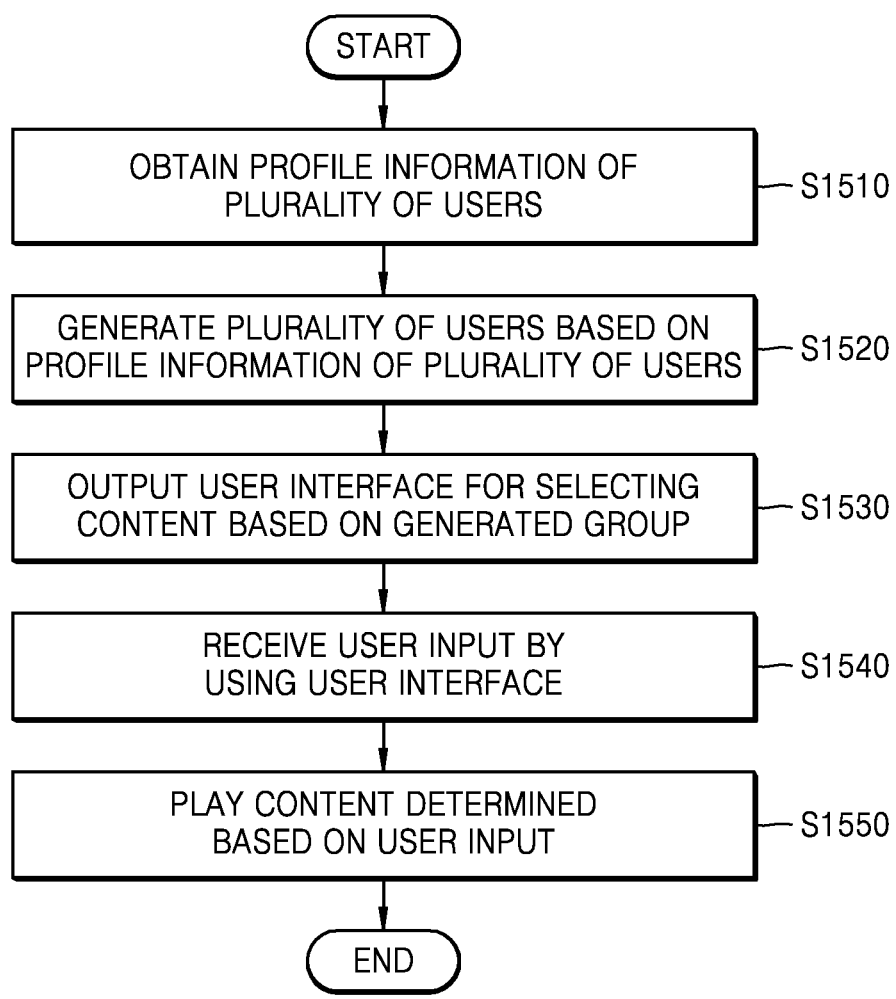
FIG. 15 illustrates a process of outputting a UI and playing content, which is performed by a display device, according to other exemplary embodiments.

FIG. 15 illustrates a process of outputting a UI and playing content, which is performed by a display device, according to other exemplary embodiments. In the current exemplary embodiments, the first display device 110 may output a UI for selecting content without having to receive electronic content guide information from the server 100. In some exemplary embodiments, the UI displayed on the first display device 110 may be a name of the user group which is substituted for the object 1202 that corresponds to user identification information shown in FIG. 12. Alternatively, according to other exemplary embodiments, a UI displayed on the first display device 110 may have a form shown in FIG. 16, but is not limited thereto.

In operation S1510, the first display device 110 generates a plurality of pieces of user profile information which correspond to the second display devices 120-1 through 120-3. According to some exemplary embodiments, the first display device 110 may obtain profile information from the server 100 or the second display devices 120-1 through 120-3.

In operation S1520, the first display device 110 generates a user group based on the user profile information. If the number of users having profile information similar to each other is equal to or greater than an arbitrary threshold value, the first display device 110 may generate a user group based on the similar profile information. For example, if two or more users from among users of the second display devices 120-1 through 120-3, whose age is equal to or greater than 30 and equal to or less than 39, and whose hobby is golfing or who has viewed a golf-related broadcasting program, are present, the server 100 may generate a user group of "golfers in their 30s".

Then, in operation S1530, the first display device 110 outputs a UI for selecting content based on the generated group. According to some embodiments, the UI for selecting content may have the form shown in FIG. 12.

Then, in operation S1540, the first display device 110 receives a user input (for example, an input by using a remote controller) via the output UI. The user input may be made to select at least one group of the displayed plurality of user groups. Then, in operation S1550, the first display device 110 outputs content that corresponds to the selected user group.

Figure 16:
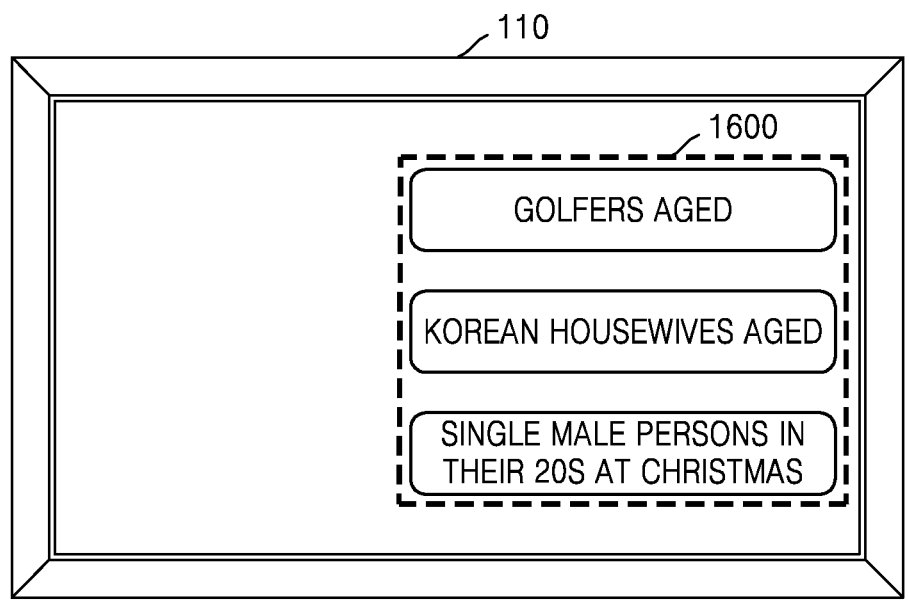
FIG. 16 illustrates an example of a UI that is output to a display device, according to exemplary embodiments that correspond to FIGS. 14 and 15.

FIG. 16 illustrates an example of a UI that is output to a display device, according to exemplary embodiments that correspond to FIGS. 14 and 15.

According to some exemplary embodiments, the first display device 110 may display a list 1600 of a plurality of user groups at a side of the display unit thereof. The displayed list 1600 of the plurality of user groups may be obtained by arranging a plurality of user groups based on a value representing a degree of similarity to a profile of a user of the first display device 110.

Figure 17:
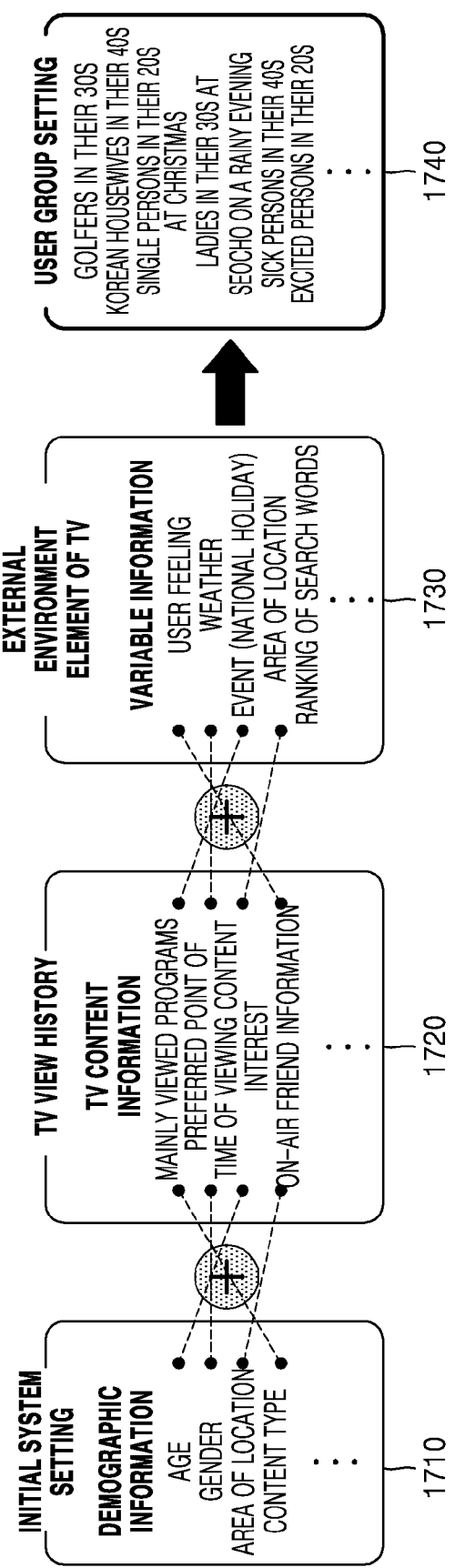
FIG. 17 is a conceptual map of a method of generating a user group, according to exemplary embodiments that correspond to FIGS. 14 and 15.

FIG. 17 is a concept map of a method of generating a user group, according to exemplary embodiments that correspond to FIGS. 14 and 15. FIG. 17 shows a case in which the first display device 110 and the second display devices 120-1 through 120-3 are TVs, but the first display device 110 and the second display devices 120-1 through 120-3 are not limited thereto.

The server 100 or the first display device 110 may generate a user group 1740 based on information 1710 included in an initial system setting of users who receive a content-providing service via the server 110, TV view history 1720 of the users, and an external environment element 1730 of a TV.

The information 1710 included in the initial system setting is information set with respect to the first display device 110 and the second display devices 120-1 through 120-3 and may be fixed information about a user. For example, the information 1710 included in the initial system setting may include at least one piece of information selected from a group consisting of an age, a gender, a residence area, and a type of preferred content of a user.

The TV view history 1720 may include a history of content that the user played by using the first display device 110 and the second display devices 120-1 through 120-3. For example, the TV view history 1720 may include at least one piece of information selected from a group consisting of a broadcasting program that a user generally views, a time when the user generally views content, an interest of a user, and on-air friend information indicating a current connection of the user to a content-view service.

The external environment element 1730 of a TV is information regarding a situation of respective users of the first display device 110 and the second display devices 120-1 through 120-3 and may refer to information that may be dynamically changed according to time. For example, the external environment element 1730 of a TV may include at least one piece of information selected from a group consisting of a feeling of a user, the weather of a current location of the user, a ranking of Internet search words, and the current location of the user.

According to some exemplary embodiments, the server 100 or the first display device 110 may generate a user group by grouping similar information based on profile information about a plurality of users.

In addition, other exemplary embodiments can also be implemented through computer-readable code/instructions in/on a medium, e.g., a computer-readable medium, to control at least one processing element to implement any above-described exemplary embodiment. The medium can correspond to any non-transitory medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs). Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It may be understood that the exemplary embodiments described herein should be considered in a descriptive sense only and not for purposes of limitation. Descriptions of features or aspects within each embodiment should typically be considered as available for other similar features or aspects in other embodiments. For example, each component described in singular form may be executed in a distributed form. Likewise, components described in a distributed form may be executed in a combined form.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling a first device, the method comprising:
   transmitting identification information of a first user from the first device to a server;
   obtaining, from the server, identification information of a plurality of second users that are related to the first user and content information corresponding to the plurality of second users, the content information comprising information of content that is being displayed on a plurality of second devices respectively corresponding to the plurality of second users;
   displaying, on the first device, a user interface (UI) for selecting content that corresponds to the content information; and
   in response to selecting content using the UI, playing, on the first device, the selected content,
   wherein the UI comprises a plurality of objects, each object comprising identification information of one of the plurality of second users and content information corresponding to the one of the plurality of second users, and the plurality of objects are displayed within the UI in order of closeness between the first user and each of the plurality of second users; and
   wherein the order of closeness is determined based on comparing a viewing rate referring to a time during which content has been viewed by each of the plurality of second users as compared to a total time of the content.

2. The method of claim 1, wherein UI comprises a plurality of profile information corresponding to the plurality of second users, and
   the displaying of the UI comprises displaying the plurality of profile information in an order determined by a closeness value of a closeness between the first user and each of the plurality of second users.

3. The method of claim 2, wherein the closeness value is determined based on a result of comparing at least one piece of information corresponding to the first user with the at least one piece of information corresponding to each of the plurality of second users, wherein the at least one piece of information is selected from a group consisting of a type of preferred content, personal information, and view history information.

4. The method of claim 2, further comprising setting a content-sharing mode,
   wherein the playing the content comprises sequentially changing the content played among content corresponding to each of the plurality profile information based on the order in which the plurality of profile information is displayed, if a preset input is received, and
   the preset input is a command which, when the content-sharing mode is not set, is a command for changing a channel to select the content played by the first device.

5. The method of claim 1, wherein the content information further comprises view history information that corresponds to the identification information of the second user, and
   the UI displayed on the first device comprises the view history information.

6. A method of controlling a server, the method comprising:
   receiving identification information of a first user from a first device;
   receiving, from a plurality of second devices, identification information of a plurality of second users that are related to the first user and content information corresponding to the plurality of second users;
   calculating a closeness value between the first user identified by the identification information of the first user and the plurality of second user identified by the identification information of the plurality of second users;
   arranging the content information corresponding to the plurality of second user based on the closeness value; and
   transmitting the arranged content information corresponding to the plurality of second user and the identification information of the plurality of second users, to the first device,
   wherein the content information comprises information of content that is being displayed on the plurality of second devices respectively corresponding to the plurality of second users, and wherein a user interface (UI) by which a user selects content that corresponds to the content information is displayed on the first device, the UI comprising a plurality of objects, each object comprising identification information of one of the plurality of second user and content information corresponding to the one of the plurality of second users, and the plurality of objects are displayed within the UI in order of closeness between the first user and each of the plurality of second users; and wherein the order of closeness is determined based on comparing a viewing rate referring to a time during which content has been viewed by each of the plurality of second users as compared to a total time of the content.

7. The method of claim 6, wherein the closeness value is determined based on a result of comparing at least one piece of information corresponding to the first user with the at least one piece of information corresponding to the at least one second user, wherein the at least one piece of information is selected from a group consisting of a type of preferred content, personal information, and view history information.

8. The method of claim 6, wherein the content information further comprises view history information that corresponds to the at least one second user.

9. A first display device comprising:
a communicator configured to transmit identification information of a first user to a server;
a controller configured to obtain identification information of a plurality of second users that are related to the first user and content information corresponding to the plurality of second users, from the server, via the communicator, wherein the content information comprises information of content that is being displayed on the plurality of second devices respectively corresponding to the plurality of second users; and
a display configured to display a user interface (UI) for selecting content that corresponds to the content information,
wherein the controller is configured to control the display, based on an input of the UI, to play the selected content in response to the selecting of the content, and
wherein the UI comprises a plurality of objects, each object comprising identification information of one of the plurality of second users and content information corresponding to the one of the plurality of second users, and the plurality of objects are displayed within the UI in order of closeness between the first user and each of the plurality of second users; and
wherein the order of closeness is determined based on comparing a viewing rate referring to a time during which content has been viewed by each of the plurality of second users as compared to a total time of the content.

10. The first device of claim 9, wherein the second user comprises a plurality of second users and the UI comprises a plurality of profile information corresponding to the plurality of second users, and
the controller is configured to control the display to display the plurality of profile information in an order determined by a closeness value of a closeness between the first user and each of the second users.

11. The first device of claim 10, wherein the closeness value is determined based on a result of comparing at least one piece of information corresponding to the first user with the at least one piece of information corresponding to each of the second users, wherein the at least one piece of information is selected from a group consisting of a type of preferred content, personal information, and view history information.

12. The first device of claim 10, wherein the controller is configured to:
set a content-sharing mode according to a user input received by the first device,
control the display to output the UI based on the content-sharing mode being set, and
if a preset input is received, sequentially change the content played by the first device among content corresponding to each of the plurality of profile information based on the order in which the plurality of profile information is displayed,
wherein the preset input is a command which, when the content-sharing mode is not set, is a command for changing a channel to select the content played by the first display device.

13. The first device of claim 9, wherein the UI displayed on the first display device further comprises a plurality of view history information corresponding to the plurality of second users.

14. A server comprising:
a communicator configured to receive, from a first device, identification information of a first user, and configured to receive, from a plurality of second devices, identification information of a plurality of second users that are related to the first user and content information corresponding to the plurality of second users; and
a controller configured to calculate a closeness value between the first user identified by the identification information of the first user and the plurality of second users identified by the identification information of the plurality of second users, and arrange the content information corresponding to the plurality of second users based on the closeness value,
wherein the communicator transmits the arranged content information corresponding to the plurality of second users and the identification information of the plurality of second users, to the first device, and the content information comprises information of content that is being displayed on the plurality of second devices respectively corresponding to the plurality of second users, and
wherein the first device displays a user interface (UI) by which a user selects content that corresponds to the content information, the UI comprising a plurality of objects, each object comprising identification information of one of the plurality of second users and content information corresponding to the one of the plurality of second users, and the plurality of objects are displayed within the UI in order of closeness between the first user and each of the plurality of second users; and
wherein the order of closeness is determined based on comparing a viewing rate referring to a time during which content has been viewed by each of the plurality of second users as compared to a total time of the content.

15. The server of claim 14, wherein the closeness value is determined based on a result of comparing at least one piece of information corresponding to the first user with the at least one piece of information corresponding to the at least one second user, wherein the at least one piece of information is selected from a group consisting of a type of preferred content, personal information, and view history information.

16. The server of claim 14, wherein the content information further comprises view history information that corresponds to the at least one second user.

17. A non-transitory computer-readable recording storage medium having stored thereon a computer program, which when executed by a computer, causes the computer to perform a method comprising:
- transmitting identification information of a first user from a first device to a server;
- obtaining, from the server, identification information of a plurality of second users that are related to the first user and content information corresponding to the plurality of second users, the content information comprising information of content that is being displayed on a plurality of second devices respectively corresponding to the plurality of second users;
- displaying, on the first device, a user interface (UI) for selecting content that corresponds to the content information; and
- in response to selecting content using the UI, playing, on the first device, the selected content,
- wherein the UI comprises a plurality of objects, each object comprising identification information of one of the plurality of second users and content information corresponding to the one of the plurality of second users, and the plurality of objects are displayed within the UI in order of closeness between the first user and each of the plurality of second users; and
- wherein the order of closeness is determined based on comparing a viewing rate referring to a time during which content has been viewed by each of the plurality of second users as compared to a total time of the content.

18. A method of controlling a first display device, the method comprising:
- transmitting first user information of a first user to a server;
- receiving, from the server, a plurality of second user information corresponding to a respective plurality of second users who are associated with the first user and a plurality of playback content information of content respectively played by the plurality of second users;
- displaying a user interface (UI) enabling the first user to select content to be played from among the a plurality of content respectively corresponding to the plurality of playback content information;
- playing content selected by the first user via the user interface, wherein the UI comprises playback content identification information and objects for displaying the plurality of second user identification information, and the objects are displayed within the UI in order of closeness between the first user and each of the plurality of second users; and
- wherein the order of closeness is determined based on comparing a viewing rate referring to a time during which content has been viewed by each of the plurality of second users as compared to a total time of the content.

19. The method of claim 18, wherein the displaying the user interface comprises:
- determining a closeness value for each of the plurality of second users with respect to the first user, and
- displaying the plurality of content in an order based on the determined closeness value for each of the plurality of second users.

20. The method of claim 18, wherein the determining the closeness value comprises, comparing information corresponding to each of the plurality of second users with the same information corresponding to the first user, wherein the information consists of information selected from a group consisting of: a type of preferred content, personal information, view history information, and membership in a user group.

* * * * *